April 9, 1957   C. A. BEST   2,787,858
FISHING TACKLE
Filed Aug. 4, 1955
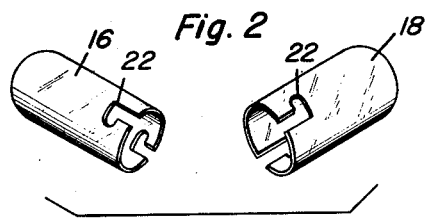
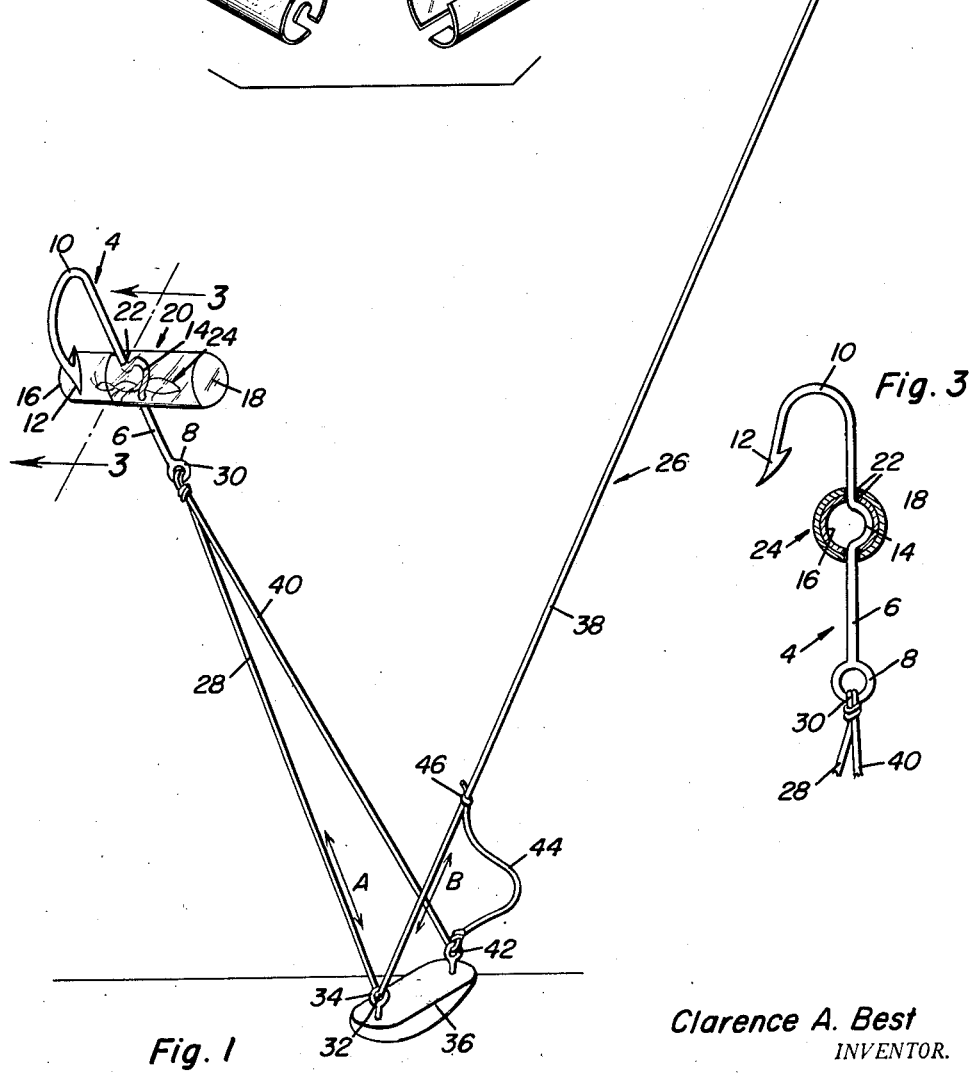
Clarence A. Best
INVENTOR.
BY *Clarence A. O'Brien*
*and Harvey B. Jacobson*
Attorneys

2,787,858

FISHING TACKLE

Clarence A. Best, New Albany, Ind.

Application August 4, 1955, Serial No. 526,520

3 Claims. (Cl. 43—43.15)

This invention relates to fishing tackle characterized, generally speaking, by a fishing line, a fishhook fastened on the free end of the line, a specially designed sinker which is intended to rest on the bottom of the body of water with a portion of the fishing line slidingly connected with the sinker and the combination therewith of a check line having one end attached to the sinker and its other end attached to an adjacent portion of the fishing line, and a buoyant member carried by the fishhook.

An obvious object of the invention is to so slidingly join the fishing line to the sinker inwardly of the fishhook that with the aid of the stated check line, it is possible to jiggle the fishing line to thus impart movement to the fishhook and, in turn, to the buoyant member which is mounted on the shank of the hook to the end that the buoyant member may thus take the form of a live bait container and the fishing line used in a manner to agitate the container and activate the bait which is confined therein.

Another object of the invention is to provide a fishhook the shank of which is provided with a lateral bend which functions to properly mount the bait holder thereon. The bait holder is novel in that it is preferably a sectional capsule with the sections of suitable transparent plastic and telescopically connected together with the telescoping ends detachably mounted on the shank of the fishhook to expedite charging the holder with a suitable bait, for example, a few pieces of grass and a live bug, for instance, and an ant or two.

Other objects, features and advantages will become more readily apparent from the following description and the accompanying sheet of drawings.

In the drawings:

Figure 1 is a perspective view of fishing tackle embodying the improvements herein under advisement.

Figure 2 is a perspective view of the aforementioned sectional capsule-type bait holder.

Figure 3 is a section on the line 3—3 of Figure 1.

Referring now to the drawings, the fishhook is denoted by the numeral 4 and embodies a shank 6 with a line eye 8 at one end and a return bend 10 at the other end terminating in a suitable pointed barb 12. The intermediate portion of the shank has a U-shaped bend 14 which serves as a shoulder-like retaining element for the sections 16 and 18 of the capsule-like bait container 20. These are simple cap-like members, the inner ends of which telescopically connect each other to provide a closed as well as buoyant container. These telescopically formed ends enclose the bend 14 and are provided with diametrically opposite pairs of bayonet slots 22 which properly register and cooperatively encircle the straight portions of said shank above and below the bend 14, and thus hold the bait holder thereon in the manner shown in Figs. 1 and 3. In actual practice, the bait is placed in this holder or container and the bait is here denoted by the numeral 24. In using experimental models, a few blades of grass were placed in the container along with a bug. In many instances, a large ant was used. Surprisingly, the ant stayed alive and constituted an attractive bait for fish for many hours, in fact, some twelve hours, more or less, and when released was still alive.

In using insects, it was found advisable to jiggle or impart motion to the bait container occasionally to keep the insect alive. This was done and is revealed herein as capable of accomplishment by way of the fishing line 26. A portion 28 of the line is tied or otherwise secured to the eye 30 of the fishhook shank. Another portion 32 is slidably passed through an eye in the eye screw 34 mounted at one end of the flat-top sinker 36. The other end portion 38 is alternately pulled and released to impart the intended and desired agitated and animated action to the bait holder. It will be noted in this connection that the amount of sliding movement of the fishing line is limited by complemental check lines. For instance, there is a line 40 which is fastened at one end and at its opposite end to an eye screw 42 on the right-hand end of the sinker in the manner shown in Fig. 1. The end portion of the same line, that is, the portion 44, extends from the eye 42 to the line 38, where it is fixedly knotted in the manner shown at 46. It follows that by jostling and otherwise handling the fishing line in the direction of the arrows A and B, movement is imparted to the shank of the hook and also to the bait holder thereon. By making the bait holder transparent and sealing the bait therein, the desired lure properties are provided and the intended results achieved.

It is preferred that the sections 16 and 18 be substantially fluid tight and they are telescoped to form the complete bait holder. Hence the bait holder is buoyant and is, in effect, a float and tends to hold the fishhook up in the manner denoted at the left in Fig. 1.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Fishing tackle comprising a fishing line, a fishhook having a line attaching eye fastened on the free end of said line, a sinker having spaced eye-screws fastened to the respective end portions thereof, a portion of said fishing line passing slidingly through the eye of one of said eye-screws, a check line having one end attached to the line eye on said fishhook, having an intermediate portion secured fixedly to the other eye-screw and its other end portion secured to said fishing line at a place adjacent to said sinker, and a sectional buoyant member removably mounted on said fishhook.

2. Fishing tackle comprising a fishhook having a shank with a return bend and a terminal barb at one end and a fishing line eye at the opposite end, the intermediate portion of said shank having a lateral bend, and a capsule-like bait holder made up of complemental sections having adjacent ends telescopically connected together, said adjacent ends having slots and said slots being connected with the shank on opposite sides of said lateral bend, whereby said lateral bend and the portions of said shank adjacent said bend serve to maintain the bait holder in the intended usable position on said shank.

3. Fishing tackle comprising a fishing line, a fishhook having a line attaching eye fastened on the free end of said line, a sinker having spaced eye-screws fastened to the respective end portions thereof, a portion of said fishing line passing slidingly through the eye of one of said eye-screws, a check line having one end attached to the line eye on said fishhook, having an intermediate portion secured fixedly to the other eye-screw and its other end portion secured to said fishing line at a place adjacent to said sinker, and a sectional buoyant member removably mounted on said fishhook, said buoyant member being hollow, having the additional function of a bait holder and comprising complemental half-sections with end portions telescopically joined together, said half-sections when joined providing a capsule-like container.

References Cited in the file of this patent

UNITED STATES PATENTS

| | | |
|---|---|---|
| 1,544,129 | Burt | June 30, 1925 |
| 1,961,539 | White | June 5, 1934 |
| 2,170,067 | Stephen | Aug. 22, 1939 |
| 2,663,108 | Dixon | Dec. 22, 1953 |
| 2,722,767 | Grady | Nov. 8, 1955 |